C. W. SMITH.
FRYING PAN.
APPLICATION FILED OCT. 31, 1912.
1,076,167.   Patented Oct. 21, 1913.
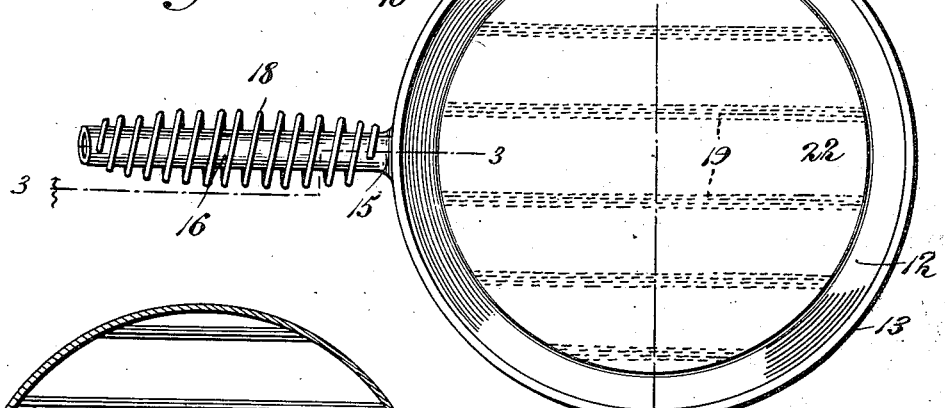
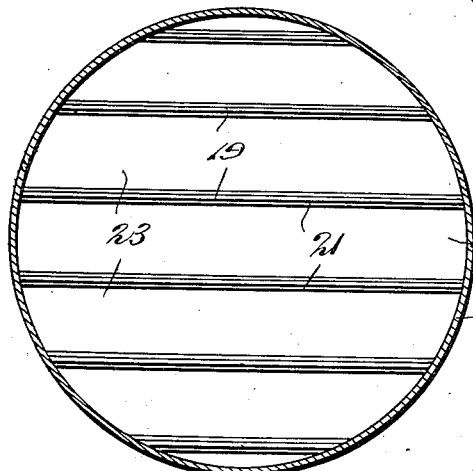
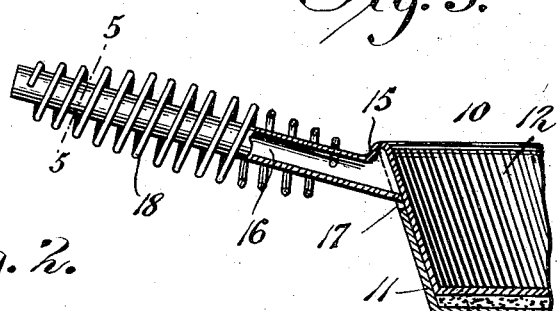
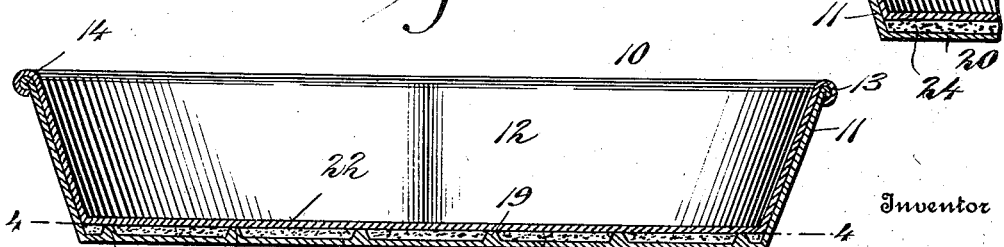
Inventor
Charles W. Smith
By Victor J. Evans
Attorney
Witnesses
W. J. McDowell

UNITED STATES PATENT OFFICE.

CHARLES W. SMITH, OF GROVE CITY, PENNSYLVANIA.

FRYING-PAN.

1,076,167. Specification of Letters Patent. Patented Oct. 21, 1913.

Application filed October 31, 1912. Serial No. 728,870.

*To all whom it may concern:*

Be it known that I, CHARLES W. SMITH, a citizen of the United States, residing at Grove City, in the county of Mercer and State of Pennsylvania, have invented new and useful Improvements in Frying-Pans, of which the following is a specification.

The invention relates to pans, more particularly to frying pans, and has for an object to provide a pan constructed to prevent the contents thereof from burning when the pan is placed upon the fire to heat the contents thereof, a further object being to provide a pan which, when subjected to heat, will result in an even distribution of the heat as the same passes through the bottom of the pan.

A still further object of the invention is to provide a frying pan that can be cheaply and efficiently constructed and having few and simple parts.

In the further disclosure of the invention reference is to be had to the accompanying drawings, constituting a part of this specification, in which similar characters of reference denote corresponding parts in all the views, and in which:

Figure 1 is a plan view of the pan; Fig. 2 is a vertical sectional view taken on the line 2—2 in Fig. 1; Fig. 3 is a fragmentary vertical sectional view taken on the line 3—3 in Fig. 1; Fig. 4 is a horizontal sectional view taken on the line 4—4 in Fig. 2; and Fig. 5 is a transverse sectional view of the handle, taken on the line 5—5 in Fig. 3.

Referring more particularly to the views, I disclose a pan 10 consisting of an outer pan body 11 and an inner pan body 12 superimposed upon and lying within the outer pan body 11, the said inner pan body having the upper peripheral edge thereof curved to form a flange 13 encircling a bead 14 formed on the upper peripheral edge of the outer pan body 11, thus rigidly securing the pan body 12 within the pan body 11, the said inner pan body 12 having a portion 15 thereof bent to project upwardly at an inclination from the inner pan body and form a tubular handle 16, integral with the said inner pan body 12, with a portion of the inner end of the handle extending into a recess 17 formed by cutting away a portion of the outer pan body 11, as shown in Fig. 3, the said handle 16 being preferably encircled by a wire like guard 18 having the ends thereof secured to the handle 16 with intermediate portions spaced from the handle to prevent the operator from burning his hand.

A series of spaced parallel ribs 19 are formed with the bottom 20 of the outer pan body 11 and project upwardly, the said ribs being formed to provide flattened surfaces forming seats 21 and upon which the bottom 22 of the inner pan body 12 reposes, thus forming spaced chambers 23 between the bottoms of the inner and outer pan bodies, with the ribs 19 forming the side walls of the chambers, a filling 24, of asbestos or other material, being arranged in the chambers 23 and thus interposed between the inner and outer bottoms of the pan bodies 11 and 12, as shown.

It will now be seen that when the pan 10 is placed upon a stove, with the bottom of the outer pan body subjected to heat, the placing of the filling 24 between the inner and outer pan bodies and the arrangement of the inner pan body relatively to the outer pan body will result in the heat from the flame of the stove being diffused to evenly heat the bottom of the inner pan body 12, thus preventing the contents of the pan 10 from being burned or unduly heated to an extent which would result in the contents of the pan becoming spoiled or unfit to be eaten.

Having thus described my invention, I claim:

In a device of the class described, the combination with an outer pan body provided with a recess, of an inner pan body arranged within the outer pan body, spaced parallel ribs formed with the outer pan body and projecting upwardly from the bottom thereof, seats formed by flattened surfaces of the said ribs and supporting the bottom of the inner pan body, chambers formed by the bottoms of the inner and outer pan bodies and by the said ribs, a filling arranged in the said chambers and lying between the said inner and outer pan bodies, and a handle formed integrally with the inner pan body and projecting therefrom, with a portion of the inner end of the said handle extending into a recess formed in the outer pan body.

In testimony whereof I affix my signature in presence of two witnesses.

CHARLES W. SMITH.

Witnesses:
LOUISE SPEARS,
C. G. HARSHAW.